W. H. PENDLETON.
ANTISKIDDING DEVICE.
APPLICATION FILED APR. 10, 1920.
1,358,391.
Patented Nov. 9, 1920.
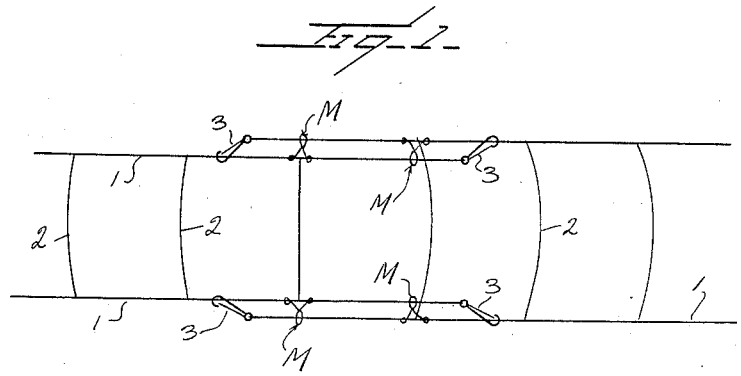
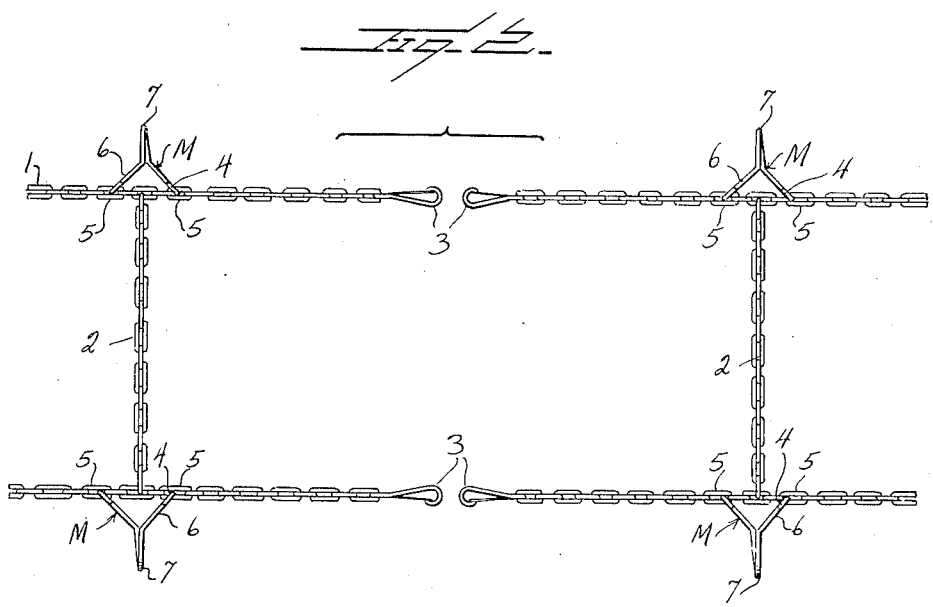
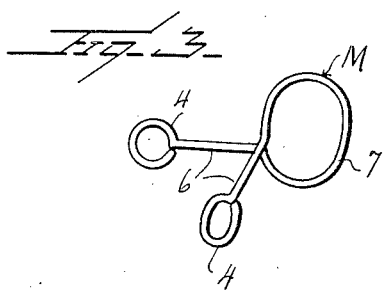
Inventor
W. H. Pendleton
By Watson E. Coleman
Attorney

UNITED STATES PATENT OFFICE.

WILLIAM H. PENDLETON, OF WASHINGTON, DISTRICT OF COLUMBIA.

ANTISKIDDING DEVICE.

1,358,391. Specification of Letters Patent. Patented Nov. 9, 1920.

Application filed April 10, 1920. Serial No. 372,832.

*To all whom it may concern:*

Be it known that I, WILLIAM H. PENDLETON, a citizen of the United States, residing at Washington, District of Columbia, have invented certain new and useful Improvements in Antiskidding Devices, of which the following is a specification, reference being had to the accompanying drawings.

This invention relates to certain improvements in anti-skidding devices and has relation more particularly to a device of this general character especially designed and adapted for use in connection with the wheels of automobiles or other vehicles, and it is an object of the invention to provide a device of this general character provided with novel and improved means whereby the same may be readily applied and effectively maintained in working position.

Another object of the invention is to provide a device of this general character which is adapted to be disposed circumferentially of the wheel and wherein the extremities are provided with novel and improved means for locking the device in applied position and which means permits a requisite adjustment in order to facilitate the proper application of the device to a wheel. The invention consists in the details of construction and in the combination and arrangement of the several parts of my improved anti-skidding device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary diagrammatic view, illustrating an anti-skidding device constructed in accordance with an embodiment of my invention;

Fig. 2 is a view in top plan of the opposite end portions of an anti-skidding device constructed in accordance with an embodiment of my invention; and Fig. 3 is a view in perspective of one of the loops or eye members herein embodied, detached.

As disclosed in the accompanying drawings, 1 denotes side chains of any ordinary or preferred construction and which, when the device is applied, extend circumferentially around the wheel at opposite sides thereof in a well known manner. The side chains 1, at predetermined points, are connected by the cross chains 2 which, when the device is applied, overlie or extend across the tread of a wheel or more particularly the tire carried by said wheel. The opposite end portions of each of the side chains 1 have suitably secured thereto the hook members 3, preferably of a snap type, and the end cross chains 2 are positioned a material distance inwardly of the adjacent ends of the side chains 1.

Each of the side chains 1, at a point in close proximity to the end cross chains 2, has loosely engaged therewith the eye or loop members M. Each of the loop members M is preferably formed of a single strand of metal, having its end portions provided with the eyes or loops 4 through each of which is loosely engaged a side bar of a link 5 of a side chain 1. The portions of each of the members M adjacent the eyes 4 constitute outwardly converging straight arms 6 terminating in the eye or loop 7. The loop 7 is skewed or turned to an angle of substantially 45° with respect to the adjacent side chains 1 so that the eye 7 will be so positioned to facilitate the insertion or threading therethrough of the end portion of the adjacent side chain 1 remote from said eye.

After the device has been disposed circumferentially of the wheel, or more particularly the tire thereof, the free end portions of the side chains, at one end of the device, are threaded through the eyes 7 at the opposite end portions of the side chains and the snap hooks 3 engaged with the links of the side chains a desired distance inwardly of the members M. By this means, the snap hooks 3 afford a medium whereby the device may be readily and conveniently adjusted with respect to the circumferential diameter of the wheel so that the fitting of the device to the wheel and the maintenance of the same in applied position is materially facilitated.

It has been fully demonstrated in practice that the members M operate to substantially eliminate the possibility of any of the snaps becoming accidentally disengaged and by having the opposite end portions of each of the side chains provided with securing or attaching means operable one independently of the other, it has been demonstrated in practice that the efficiency of the device is materially increased because should a snap hook 3 at one end of the side chain 1 become disengaged from locking position, the chain will still be properly held in applied position with respect to the wheel by the snap hook 3 at the opposite end of said side chain.

Each of the eye or loop members M operates to prevent indiscriminate flapping of an end portion of a side chain 1 in the event a fastening or hook member 3 should become accidentally disengaged during the period which the wheel to which my improved device is applied is rotating, and, furthermore, under such conditions, the eye or loop member M coacts with the fastening or hook member 3 to provide a supplemental holding means whereby the free end portion of the side chain is prevented from passing entirely through the eye or loop member M as the hook or fastening member 3 is capable of sufficient swinging movement relative to the side chain to obstruct the passage of said hook or fastening member 3 through the loop or eye member M. Furthermore, the eye or loop members M coact with the extremities of the side chain threadedly disposed therethrough to prevent chord pull, whereby the requisite maintenance of the device in operative position is materially facilitated.

From the foregoing description, it is thought to be obvious that an anti-skidding device constructed in accordance with my invention is particularly well adapted for use by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice except as hereinafter claimed.

I claim:—

An anti-skidding device comprising flexible side members, cross members connecting the same and adapted to extend over the tread of a wheel, a fastening member carried by each end portion of each of the side members for engagement with said side member at a point inwardly of the opposite end thereof, and an eye member secured to each of the side members at points inwardly of their ends, each eye member having an opening of a size to permit the opposite end of the side member and the fastening member carried thereby to be threaded therethrough, said eye member operating to hold the end portion of the side member disposed therethrough against undue flapping in the event the fastening member carried by said threaded end portion of the side chain becomes accidentally disengaged, said eye member also coacting with said fastening member to provide additional holding means when said fastening member is disengaged.

In testimony whereof I hereunto affix my signature.

WILLIAM H. PENDLETON.